(12) United States Patent
Ishii et al.

(10) Patent No.: US 11,436,392 B2
(45) Date of Patent: Sep. 6, 2022

(54) SUBSTRATE PROCESSING APPARATUS AND STORAGE MEDIUM HAVING PROGRAM STORED THEREIN

(71) Applicant: EBARA CORPORATION, Tokyo (JP)

(72) Inventors: Yu Ishii, Tokyo (JP); Keisuke Uchiyama, Tokyo (JP); Kunio Oishi, Tokyo (JP); Hiroyuki Takenaka, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 864 days.

(21) Appl. No.: 15/982,814

(22) Filed: May 17, 2018

(65) Prior Publication Data

US 2018/0336301 A1 Nov. 22, 2018

(30) Foreign Application Priority Data

May 18, 2017 (JP) .............................. JP2017-099141

(51) Int. Cl.
*G06F 17/18* (2006.01)
*G06F 30/20* (2020.01)
(Continued)

(52) U.S. Cl.
CPC .............. *G06F 30/20* (2020.01); *G06F 17/18* (2013.01); *H01L 21/67253* (2013.01);
(Continued)

(58) Field of Classification Search
CPC ...... G06F 30/20; G06F 17/18; G06F 2111/10; G06N 3/08; G06N 5/003; H01L 21/67253;
(Continued)

(56) References Cited

U.S. PATENT DOCUMENTS

| 5,709,593 A * | 1/1998 | Guthrie ................... B24B 37/04 451/286 |
| 7,983,776 B2 * | 7/2011 | Dudman ................. H01L 22/12 700/121 |
| 2002/0197745 A1 * | 12/2002 | Shanmugasundram ..................... G05B 19/19 438/459 |

(Continued)

FOREIGN PATENT DOCUMENTS

| JP | 2007-242658 A | 9/2007 |
| JP | 2009-142973 A | 7/2009 |

(Continued)

OTHER PUBLICATIONS

Angus M. Brown, "A step-by-step guide to non-linear regression analysis of experimental data using a Microsoft Excel spreadsheet", 2001, Elsevier Science (Year: 2001).*

*Primary Examiner* — John E Johansen
(74) *Attorney, Agent, or Firm* — BakerHostetler

(57) ABSTRACT

A substrate processing apparatus for processing a substrate includes a setting device that sets a plurality of recipe items including operation conditions of the substrate processing apparatus and a recipe generating device that acquires a plurality of recipe models obtained by changing values of the plurality of recipe items and experimenting or simulating a processing result of the substrate and analyzes the plurality of recipe models to generate a recipe, the recipe generating device combining a part or all of the plurality of recipe models to generate the recipe such that a calculation value of a processing result of the substrate by the recipe satisfies a predetermined condition.

13 Claims, 8 Drawing Sheets

(51) Int. Cl.
*H01L 21/67* (2006.01)
*G06N 3/08* (2006.01)
*G06N 5/00* (2006.01)
*G06F 111/10* (2020.01)

(52) U.S. Cl.
CPC .... H01L 21/67259 (2013.01); *G06F 2111/10* (2020.01); *G06N 3/08* (2013.01); *G06N 5/003* (2013.01); *H01L 21/67092* (2013.01); *H01L 21/67276* (2013.01)

(58) Field of Classification Search
CPC ......... H01L 21/67259; H01L 21/67092; H01L 21/67276
USPC ............................................................ 703/2
See application file for complete search history.

(56) References Cited

U.S. PATENT DOCUMENTS

| | | | |
|---|---|---|---|
| 2006/0015206 A1* | 1/2006 | Funk | ................. H01L 21/67253 700/121 |
| 2013/0213437 A1* | 8/2013 | Ishii | ................... H01L 21/67046 15/97.1 |
| 2014/0220866 A1 | 8/2014 | Ishii et al. | |

FOREIGN PATENT DOCUMENTS

| | | |
|---|---|---|
| JP | 2010-260140 A | 11/2010 |
| JP | 2014-150178 A | 8/2014 |
| JP | 2015-211133 A | 11/2015 |

* cited by examiner

PROFILE IN RADIAL DIRECTION

Fig. 5

CREATION EXAMPLE OF MODELS

| MODEL | HEAD POSITION (mm) | NUMBER OF WAFER REVOLUTIONS (rpm) | NUMBER OF HEAD REVOLUTIONS (rpm) | PROCESSING TIME (SECOND) | IN-PLANE UNIFORMITY (%) |
|---|---|---|---|---|---|
| CASE 01 | 70 | 105 | 11 | 10 | 53 |
| CASE 02 | 70 | 105 | 41 | 10 | 46 |
| CASE 03 | 50 | 105 | 131 | 10 | 56 |
| CASE 04 | 30 | 105 | 11 | 10 | 95 |
| CASE 05 | 30 | 105 | 131 | 10 | 97 |

Fig. 6

CREATION EXAMPLE OF RECIPE

| PROCESS | | HEAD POSITION (mm) | NUMBER OF WAFER REVOLUTIONS (rpm) | NUMBER OF HEAD REVOLUTIONS (rpm) | PROCESSING TIME (SECOND) | IN-PLANE UNIFORMITY (%) |
|---|---|---|---|---|---|---|
| STEP 1 | CASE 01 | 70 | 105 | 11 | 10 | 53 |
| STEP 2 | CASE 02 | 70 | 105 | 41 | 10 | 46 |
| NONUSE | CASE 03 | 50 | 105 | 131 | 0 | 56 |
| STEP 3 | CASE 04 | 30 | 105 | 11 | 10 | 95 |
| NONUSE | CASE 05 | 30 | 105 | 131 | 0 | 97 |

Fig. 9

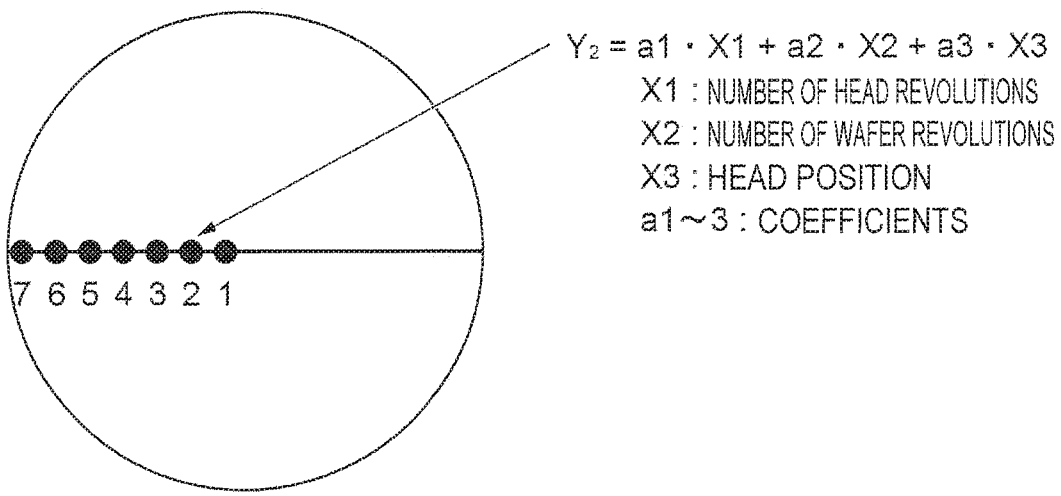

$Y_2 = a1 \cdot X1 + a2 \cdot X2 + a3 \cdot X3$
X1 : NUMBER OF HEAD REVOLUTIONS
X2 : NUMBER OF WAFER REVOLUTIONS
X3 : HEAD POSITION
a1~3 : COEFFICIENTS

Fig. 10

SIMULATION UNDER CONDITIONS OF CASE 01 (HEAD POSITION=70 mm, NUMBER OF WAFER REVOLUTIONS=105 rpm, NUMBER OF HEAD REVOLUTIONS=11 rpm, PROCESSING TIME=10 SECONDS)

| RADIAL DIRECTION POSITION (r) | POLISHING AMOUNT (μm) | FILM THICKNESS DISTRIBUTION (μm) | FILM THICKNESS DISTRIBUTION AFTER POLISHING (μm) |
|---|---|---|---|
| 0.5 | 50 | 70 | 20 |
| 1.0 | 40 | 80 | 40 |
| 1.5 | 30 | 60 | 30 |

SUBSTRATE PROCESSING APPARATUS AND STORAGE MEDIUM HAVING PROGRAM STORED THEREIN

CROSS-REFERENCE TO RELATED APPLICATION

This application is based upon and claims benefit of priority from Japanese Patent Application No. 2017-099141 filed on May 18, 2017, the entire contents of which are incorporated herein by reference.

TECHNICAL FIELD

The present invention relates to a substrate processing apparatus and a storage medium having recorded therein a computer program for causing a computer to execute recipe creation processing.

BACKGROUND ART

A semiconductor apparatus is manufactured through many manufacturing processes. As requirements for control of the manufacturing process become more difficult, recipe generation for a series of processes such as processing (polishing, cleaning, and the like), conveyance, a test, an evaluation process also becomes more difficult.

For example, in general, as an apparatus that polishes a substrate, there is known an apparatus that polishes a substrate while tilting a polishing head attached with a polishing instrument with respect to the substrate. When polishing the substrate while repeatedly changing an angle of the polishing head according to a predetermined pattern, in an operation recipe in the past, the substrate is sometimes not uniformly polished. Therefore, the applicants have proposed a polishing apparatus capable of generating a polishing recipe for such an apparatus as disclosed in Japanese Patent Laid-Open No. 2010-260140 (PTL 1).

On the other hand, as an apparatus that polishes a substrate, there is an apparatus for polishing the rear surface of a substrate disclosed in Japanese Patent Laid-Open No. 2014-150178 (PTL 2). The apparatus polishes the substrate while translating a polishing head attached with a polishing tape with respect to the substrate. However, an apparatus for generating an operation recipe of the polishing head in such an apparatus has not been proposed.

Note that there is known a CMP apparatus that holds a substrate in a top ring and presses the substrate against a polishing pad and relatively moves and polishes the substrate while supplying slurry liquid including abrasive grains to the substrate. The applicant proposed, in the past, a recipe generating method applied to such a CMP apparatus (Japanese Patent Laid-Open No. 2015-211133 (PTL 3)). However, a recipe of the CMP apparatus cannot be applied to a rear surface polishing apparatus. This is because a process of the rear surface polishing apparatus is completely different from a process of the CMP apparatus; for example, in the rear surface polishing apparatus, abrasive grains are present on a polishing tape side and only rinse water is supplied onto a table, and processing needs to be performed for a long time at a low number of revolutions (rotating speed) at which desired in-plane uniformity is obtained.

CITATION LIST

Patent Literature

PTL 1: Japanese Patent Laid-Open No. 2010-260140
PTL 2: Japanese Patent Laid-Open No. 2014-150178
PTL 3: Japanese Patent Laid-Open No. 2015-211133

SUMMARY OF INVENTION

Technical Problem

An object of the present invention is to solve at least a part of the problems explained above.

Solution to Problem

According to an aspect of the present invention, there is provided a substrate processing apparatus for processing a substrate, the substrate processing apparatus including: a setting device that sets a plurality of recipe items including operation conditions of the substrate processing apparatus; and a recipe generating device that acquires a plurality of recipe models obtained by changing values of the plurality of recipe items and experimenting or simulating a processing result of the substrate and analyzes the plurality of recipe models to generate a recipe, the recipe generating device combining a part or all of the plurality of recipe models to generate the recipe such that a calculation value of a processing result of the substrate by the recipe satisfies a predetermined condition.

A part or all of the plurality of recipe models can be combined to automatically generate a recipe such that a substrate processing result satisfies the predetermined condition. Consequently, complicated processing for combining a part or all of the plurality of recipe models can be automatically performed. It is possible to generate a highly accurate recipe.

BRIEF DESCRIPTION OF DRAWINGS

FIG. 5 is a model generation example by a simulation;
FIG. 6 is a generation example of a recipe;
FIG. 9 is an explanatory diagram for explaining model generation by a statistical method;
FIG. 10 is a model generation example in the case in which a film thickness distribution is known.

DESCRIPTION OF EMBODIMENT

In the following explanation, a substrate processing apparatus is any processing apparatus that applies some processing to a substrate. The substrate is any workpiece processed in the substrate processing apparatus. The substrate includes, for example, a semiconductor substrate, a glass substrate, a liquid crystal substrate, and a printed circuit board (a printed board). The substrate may be a magnetic recording medium, a magnetic recording sensor, a mirror, an optical element or a micro machine element, or a partially manufactured integrated circuit. The shape of the substrate is not limited to a circular shape and may be, for example, a square shape. In the following explanation, an example is explained in which the substrate is a circular semiconductor wafer. The processing is, for example, polishing, plating, etching, or film formation.

(Configuration of the Substrate Processing Apparatus)

Figure 1:
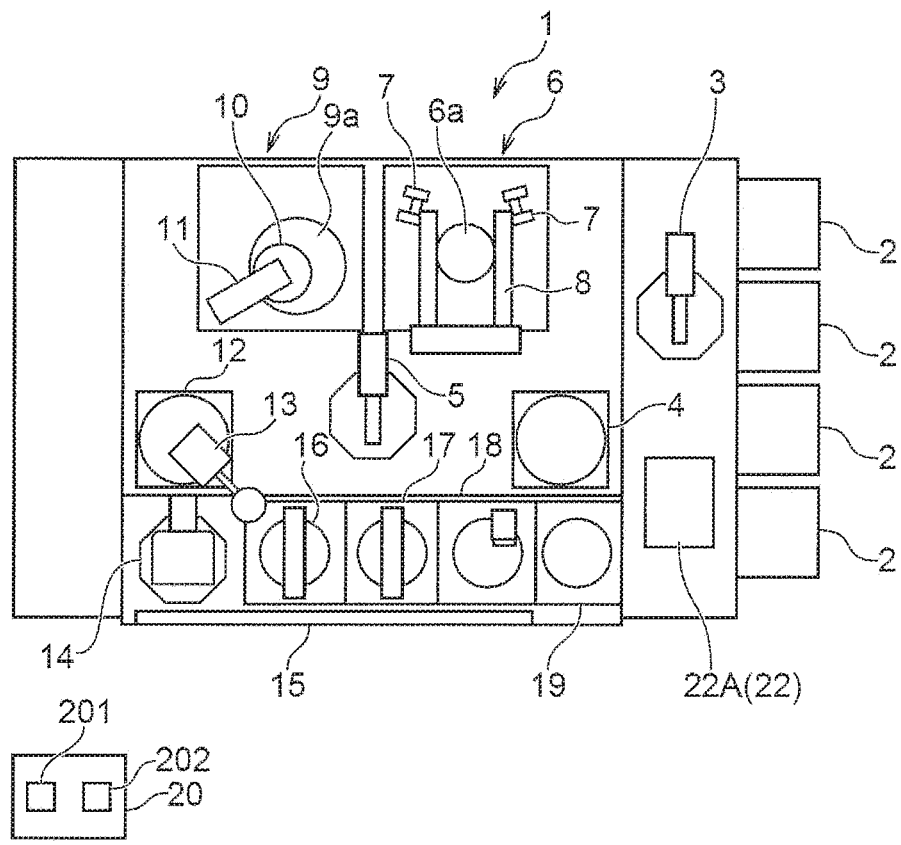
FIG. 1 is a plan view showing a polishing apparatus according to an embodiment.

FIG. 1 is a plan view showing a polishing apparatus 1 according to an embodiment of the present invention. The polishing apparatus 1 is an example of the substrate processing apparatus. The polishing apparatus 1 polishes a substrate, which is an object to be polished or a polishing target object. In the following explanation, an example is explained in which the polishing apparatus 1 as the substrate processing apparatus polishes a semiconductor wafer (hereinafter simply referred to as wafer).

The polishing apparatus 1 includes a plurality of load ports 2, polishing units 6 and 9, cleaning units 16, 17, and 18, and a drying unit 19. In the following explanation, two polishing units 6 and 9 are provided in the polishing apparatus 1. However, one or three or more polishing units may be provided. The polishing units 6 and 9 can be polishing units of the same type. A part of polishing units can be polishing units of different types.

The load ports 2 house pluralities of wafers. The load ports 2 are, for example, FOUPs (Front-Opening Unified Pods). A conveyance robot 3 is provided adjacent to the load ports 2. The conveyance robot 3 conveys wafers from the load ports 2 to a wafer station 4. The wafer station 4 includes a first station, a reversing machine, and a second station. The first station, the reversing machine, and the second station are disposed in this order from above. A wafer from the conveyance robot 3 is placed on the first station. A conveyance robot 5 is disposed between the wafer station 4 and the polishing units 6 and 9. The conveyance robot 5 conveys the wafer from the first station of the wafer station 4 to the polishing unit 6.

The polishing unit 6 is used for polishing of a bevel section (and a rear surface outer circumferential region) of the wafer. The polishing unit 6 includes a rotary table 6a on which the wafer is placed, the rotary table 6a being rotated by a not-shown motor or the like, a polishing head 7 to which a polishing instrument such as a polishing tape is attached, and a centering loader 8 that centers and places the wafer on the rotary table 6a. The wafer is placed on the rotary table 6a with the rear surface faced down. The diameter of the rotary table 6a is smaller than the diameter of the wafer. The rear surface outer circumferential region of the wafer protrudes to the outer side from the rotary table 6a. The polishing unit 6 presses, while rotating the wafer, the polishing head 7 against the bevel section of the wafer and polishes bevel section of the wafer while tilting the polishing head 7 with respect to the bevel section of the wafer. The polishing unit 6 may press, while rotating the wafer, the polishing head 7 against the rear surface outer circumferential region of the wafer from below and polish the rear surface outer circumferential region of the wafer. During the polishing, polishing liquid (e.g., pure water) is supplied to the front surface and the rear surface of the wafer from a not-shown nozzle. After the polishing of the wafer in the polishing unit 6, the conveyance robot 5 conveys the wafer to the reversing machine of the wafer station 4. The reversing machine passes the wafer to the second station after reversing the wafer. The second station includes an ascending and descending mechanism, receives the wafer from the reversing machine in an ascending position and passes the wafer in a descending position. The conveyance robot 5 takes out the wafer in the descending position of the second station and conveys the wafer to the polishing unit 9.

The polishing unit 9 is used for, for example, polishing of the entire rear surface (or the entire rear surface excluding the outer circumferential region) of the wafer. The polishing unit 9 includes a substrate holding section 9a that holds and rotates the wafer and a polishing head 10 that presses the polishing instrument such as the polishing tape against the rear surface of the wafer. The wafer is set with the rear surface faced upward. The substrate holding section 9a is rotated by a not-shown motor, whereby the wafer is rotated. The polishing head 10 is supported by a head arm 11. The head arm 11 is fixed to a swinging shaft coupled to a driving machine such as a not-shown motor. The head arm 11 is swung when the swinging shaft is rotated by the driving machine. A rotation angle of the head arm 11 is changed by the swing, whereby a position (a head position) of the polishing head 10 with respect to the wafer is adjusted. The polishing head 10 is rotated by a rotating mechanism (not shown in FIG. 1) incorporated in the head arm 11. In a state in which the polishing head 10 is pressed against the rear surface of the wafer, the polishing head 10 and the wafer are rotated to be relatively moved to polish the entire rear surface of the wafer. During the polishing, the polishing liquid (e.g., the pure water) is supplied to the rear surface of the wafer from the not-shown nozzle.

The wafer finished being polished in the polishing unit 9 is placed on a wafer station 12 by the conveyance robot 5. The wafer placed on the wafer station 12 is conveyed to a reversing machine 14 by a swing transporter 13 and reversed by the reversing machine 14. The reversed wafer is conveyed to a cleaning unit 16 by a linear transporter 15 and sequentially cleaned in the cleaning units 16, 17, and 18. In this example, the cleaning units 16 and 17 are cleaning units of a roll scrub type that scrubs and cleans both the surfaces of the wafer with a roll sponge. The cleaning unit 18 is a cleaning unit of a pencil type that scrubs and cleans the wafer with a pencil-type brush. Movement of the wafer among the cleaning units 16, 17, and 18 is performed by the linear transporter 15. The wafer finished being cleaned in the cleaning units 16, 17, and 18 is conveyed to the drying unit 19 and dried in the drying unit 19. The drying unit 19 is, for example, a spin rinse driver (SDR). The drying unit 19 rotates the wafer at high speed and dries the wafer. The dried wafer is conveyed to the load port 2 by the conveyance robot 3.

A film-thickness measuring section 22 including a film-thickness measuring device 22A that measures the film thicknesses of the wafer before and after the polishing may be provided. The film-thickness measuring device 22A can be, for example, a sensor that optically measures a film thickness.

A polishing system including the polishing apparatus 1 configured as explained above includes a controller 20 configured to control the sections explained above. In an example, the controller 20 is one of components of the polishing apparatus 1. The controller 20 may be disposed on the inside of the polishing apparatus 1 or may be disposed adjacent to the polishing apparatus 1. The controller 20 includes a memory 202 having stored therein various setting data and various computer programs and a CPU 201 that executes the computer programs stored in the memory 202. A storage medium configuring the memory 202 can include one or a plurality of any storage media such as a ROM, a RAM, a hard disk, a CD-ROM, a DVD-ROM, and a flexible disk. The computer programs stored in the memory 202 include, for example, a computer program for performing control of polishing in the polishing units 6 and 9, a computer program for performing conveyance control by conveying devices such as a conveyance robot and a transporter, and a computer program for generating and updating a recipe explained below. The controller 20 is configured to be capable of communicating with a not-shown host controller that collectively controls the polishing apparatus 1 and other related apparatuses. The controller 20 can exchange data with a database included in the host controller.

(Recipe Generation)

Processing for automatically generating a recipe for optimizing a polishing profile after entire rear surface polishing in the polishing unit 9 of the polishing apparatus 1 is explained. The recipe includes a combination of processing conditions of the substrate processing apparatus. The processing conditions include operation conditions of the sections of the substrate processing apparatus. In this embodiment, the recipe includes a combination of polishing conditions. In this embodiment, an example is explained in which a recipe of the polishing of the polishing unit 9 is set.

Figure 2:
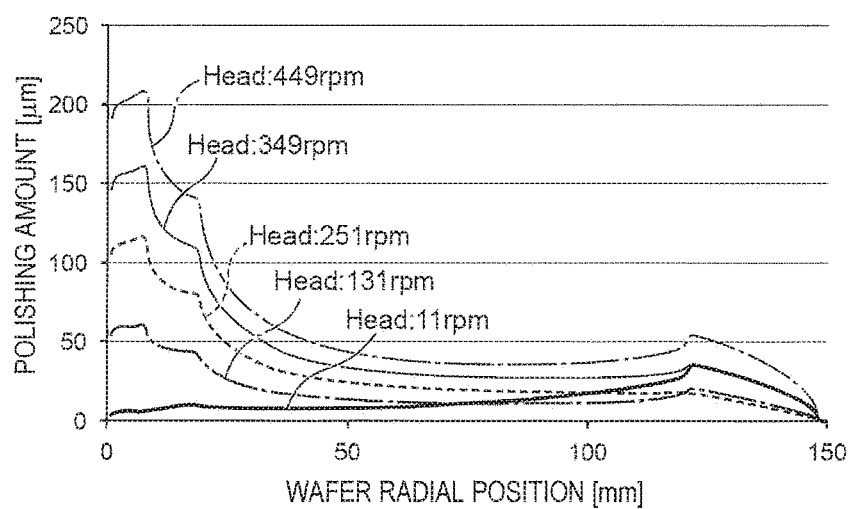
FIG. 2 is a simulation result of a polishing amount profile at each number of head revolutions.
Figure 3:
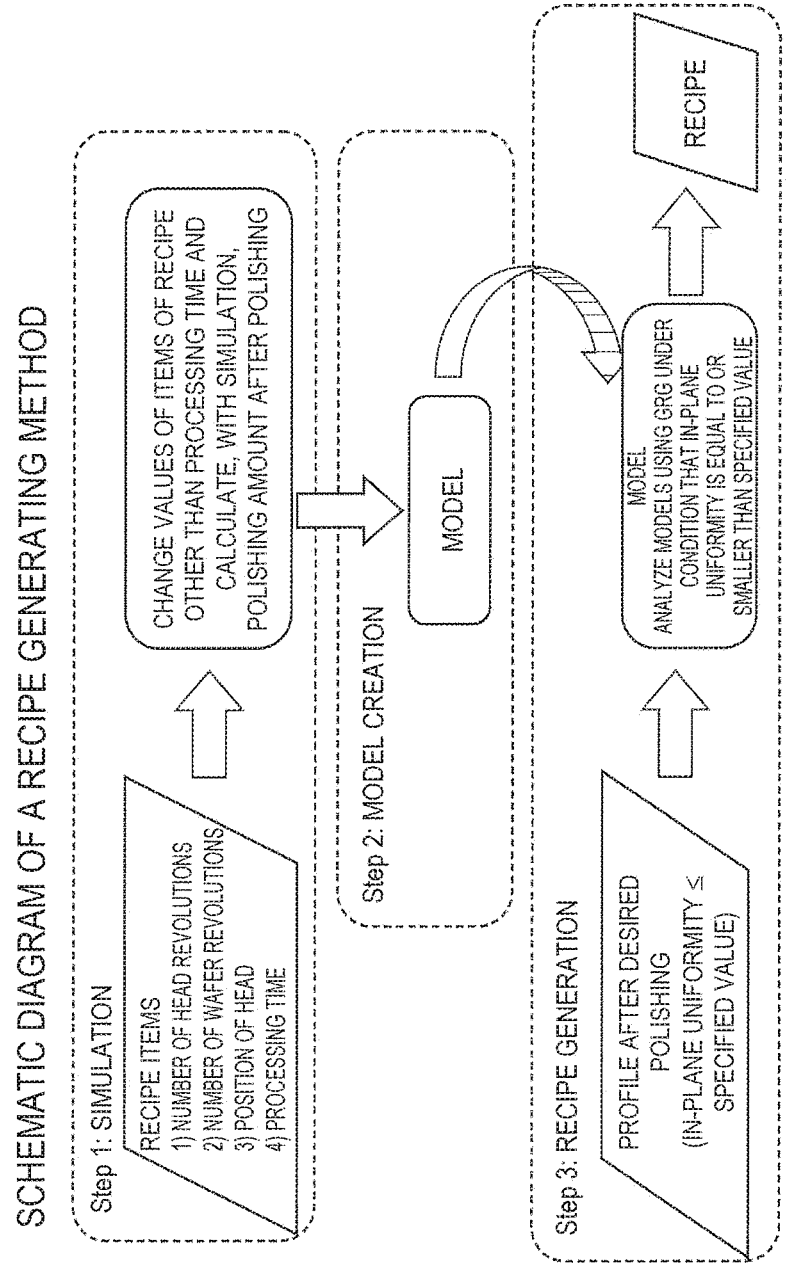
FIG. 3 is a schematic diagram of a recipe generating method.
Figure 4:
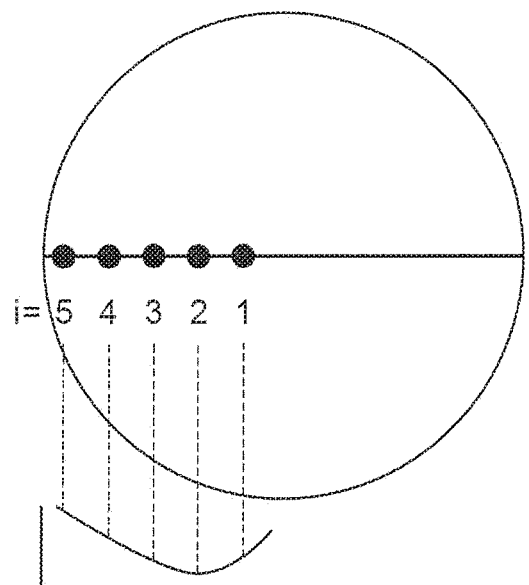
FIG. 4 is an explanatory diagram for explaining a profile in a radial direction.

FIG. 2 shows an example of a simulation result of polishing amounts (a profile) at each number of head revolutions of the polishing head 10. FIG. 3 is a schematic diagram of a recipe generating method according to this embodiment. FIG. 4 is an explanatory diagram for explaining a profile in a radial direction. FIG. 5 is a recipe model generation example by a simulation. FIG. 6 is a generation example of a recipe obtained by combining recipe models. Note that a recipe generating device that performs the following recipe generation processing is realized by the controller 20 of the polishing apparatus 1. In another example, a part or the entire recipe generating device that performs the recipe generation processing may be configured by a CPU (a CPU and a control section functioning as a combination of computer programs executed in the CPU) other than the controller 20, dedicated hardware such as an application specific integrated circuit such as an ASIC or a PLC, or a combination of the CPU and the dedicated hardware.

As shown in FIG. 3, in Step 1, the controller 20 sets recipe items and calculates or obtains, with a simulation, a film thickness distribution (a polishing amount profile) after polishing. The controller 20 sets the recipe items by, for example, receiving an input and selection from a user. In this embodiment, the number of head revolutions, the number of wafer revolutions, a head position, and a processing time are used as the recipe items (processing condition items). The number of head revolutions is rotating speed of the polishing head 10 and is represented by the number of revolutions per one minute (rpm). The number of wafer revolutions is rotating speed of a wafer rotated by a rotary table and is represented by the number of revolutions per one minute (rpm). In this embodiment, the number of revolutions of the wafer is set to 105 rpm. The head position is a position of the polishing head 10 with respect to the center position of the wafer. The head position is adjusted according to, for example, a turning angle of the arm 11. The processing time is a time period of the polishing.

In Step 1, the controller 20 changes values of the items of the recipe other than the processing time and calculates or obtains, with a simulation, a polishing amount profile after the polishing. In the following explanation, an example is explained in which the polishing amount profile is calculated or obtained by the simulation. However, the polishing amount profile may be calculated or obtained by an experiment. Note that, when the polishing amount profile is calculated or obtained by the experiment, the recipe items may be sequentially changed by the controller 20, polishing of the wafer is actually performed according to the set recipe items, and a polishing amount profile after the polishing may be automatically calculated or obtained. Note that, with a film thickness distribution of the wafer before the polishing fixed (e.g., 80 μm), the controller 20 may subtract polishing amounts in positions from the fixed film thickness to calculate or obtain a film thickness distribution after the polishing. In this case, the film thickness distribution after the polishing can be used instead of the polishing amount profile.

For example, as shown in FIG. 2, a result of the simulation is represented as a polishing amount profile at each number of head revolutions. In FIG. 2, the horizontal axis indicates a radial direction position of a wafer and the vertical axis indicates a polishing amount (μm). The radial direction position of the wafer is a position based on the center position of the wafer shown in FIG. 4. In FIG. 4, for example, i=1 is a point of 30 mm, i=2 is a point of 60 mm, i=3 is a point of 90 mm, i=4 is a point of 120 mm, and i=5 is a point of 150 mm. The radial direction position of the wafer is not limited to the positions illustrated in FIG. 4 and can be set as continuous positions. In FIG. 2, a polishing amount profile in the case in which the number of head revolutions is changed is shown. However, in Step 1, the controller 20 calculates or obtains a polishing amount profile at the time when a combination of the number of head revolutions, the number of wafer revolutions, the head position, and the processing time is changed. However, because the polishing amount changes in proportion to the processing time, with the processing time set to a fixed unit time (e.g., 10 seconds), the controller 20 calculates or obtains a polishing amount profile at the time when a combination of the number of head revolutions, the number of wafer revolutions, and the head position is changed. Note that, the number of head revolutions, the number of wafer revolutions, and the head position are used as the recipe items. However, a part of the items may be omitted or other items may be added.

In Step 2, the controller 20 generates recipe models on the basis of the simulation result in Step 1. In FIG. 5, cases 01 to 05 are illustrated as five recipe models. With the processing time set to the fixed unit time (10 seconds), the controller 20 changes the head position, the number of wafer revolutions, and the number of head revolutions and calculates or obtains the polishing amount profile illustrated in FIG. 2. The recipe models include at least the recipe items (the head position, the number of wafer revolutions, the number of head revolutions, and the processing time) and a processing result (the polishing amount profile or the film thickness distribution).

Note that the recipe models include a result of calculating in-plane uniformity (%) of a wafer film thickness distribution after polishing on the basis of the polishing amount profile in the example of FIG. 5. The in-plane uniformity can be calculated by the following Expression 1.

In-plane uniformity=(dispersion σ of polishing amounts)/(average Ave of polishing amounts)×100(%) (Expression 1)

For example, in values of the recipe items of the model case 01, the in-plane uniformity is 53%. However, the in-plane uniformity is not necessarily essential as data of the recipe models.

Subsequently, in Step 3, the controller 20 analyzes a plurality of recipe models (the cases 01 to 05 in FIG. 5) with a GRG (Generalized Reduced Gradient method) under a condition (a restriction condition or a predetermined condition) that the in-plane uniformity of the wafer after the polishing is equal to or smaller than a specified value and calculates or obtains a recipe as a combination of a part or all of the plurality of recipe models. The specified value can be set to, for example, 10%. In this analysis, the recipe as the combination of a part or all of the plurality of recipe models is obtained. A calculation value of a polishing amount profile by the recipe is also obtained. In this embodiment, the controller 20 calculates in-plane uniformity from the calculation value of the polishing amount profile and determines whether the in-plane uniformity satisfies the predetermined condition. When the in-plane uniformity satisfies the predetermined condition, the controller 20 adopts the recipe. When the in-plane uniformity does not satisfy the predetermined condition, the controller 20 adds a recipe model as explained below. The controller 20 calculates or obtains a recipe again with the GRG using a plurality of recipe models after the addition (the recipe models calculated or obtains in Step 2 and the added recipe model) to calculate a polishing amount profile and in-plane uniformity. The controller 20 repeats this processing to generate a recipe in which the in-plane uniformity satisfies the predetermined condition. Note that the condition that the in-plane uniformity is equal to or smaller than the specified value is adopted as a profile after desired polishing. However, other conditions may be used.

The GRG is a method called generalized reduced gradient method and is a method obtained by generalizing a reduced gradient method treated in a linear programming problem into a nonlinear programming problem. In the GRG, an available software library or the like can be used. An obtained result of the recipe in Step 3 is shown in FIG. 6. In this example, in the process steps 1, 2, and 3, the in-plane uniformity of 10% or less after the polishing is achieved by a combination for sequentially executing the cases 01, 02, and 04 of the recipe models. In the combination shown in FIG. 6, the in-plane uniformity is 9.8%. Note that the model cases 03 and 05 are not selected. In this way, not all of the recipe models are used in some case. To satisfy the restriction condition, order and a combination of the recipe models are selected. Note that, in the above explanation, the recipe models are analyzed by the GRG. However, the recipe models may be analyzed by machine learning.

Figure 7:
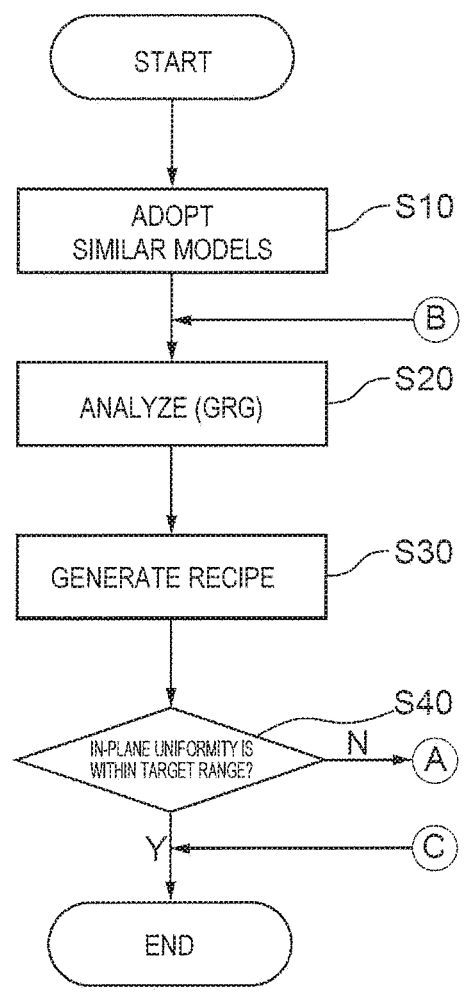
FIG. 7 is a flowchart No. 1 of recipe generation.
Figure 8:
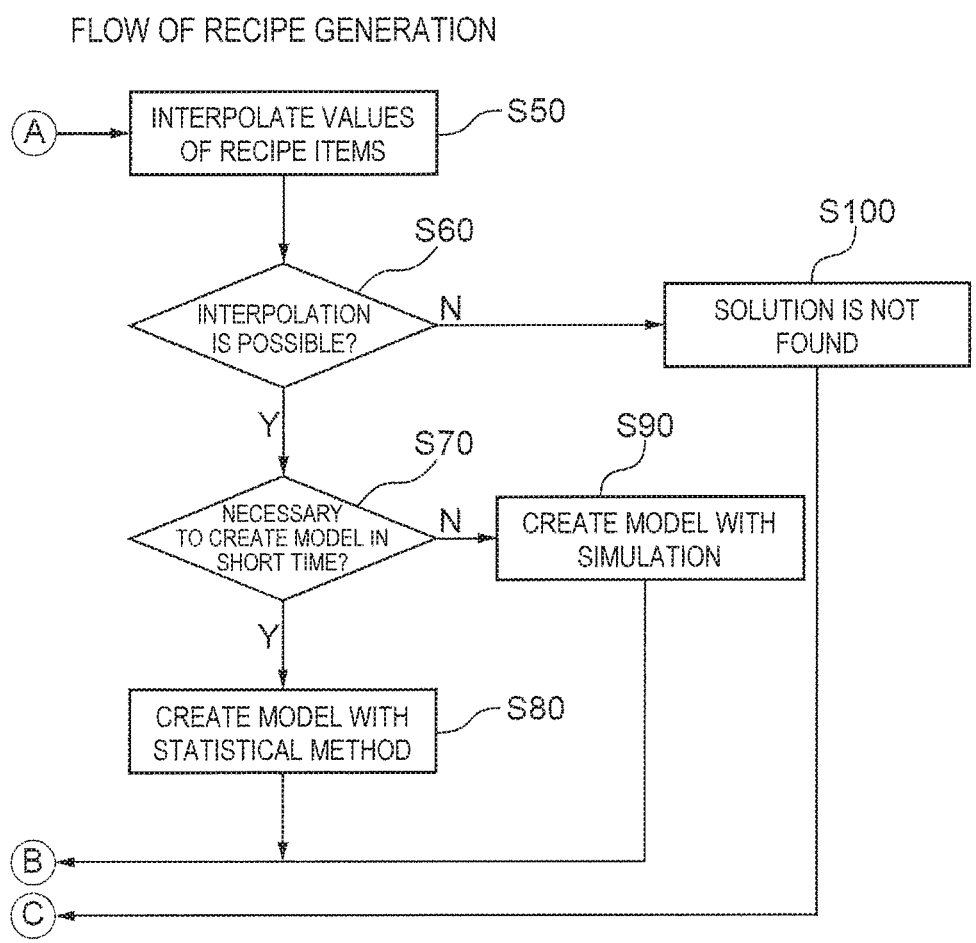
FIG. 8 is a flowchart No. 2 of the recipe generation.

FIGS. 7 and 8 show flowcharts of recipe generation processing according to this embodiment. A flow shown in the flowcharts can be executed by, for example, the controller 20 of the substrate processing apparatus 1 or other computers.

In step S10, the controller 20 adopts similar recipe models (e.g., the cases 01 to 05 shown in FIG. 5) created by a simulation or an experiment. As the recipe models, polishing amount profiles are calculated or obtained by performing a simulation or an experiment while, with the processing time among the recipe items set to the fixed unit time, changing the head position, the wafer position, and the number of head revolutions in the combinations of the values shown in FIG. 5. The recipe models include combinations of these recipe items and the polishing amount profiles (e.g., the cases 01 to 05 shown in FIG. 5). The recipe models can be calculated or obtained by executing a simulation with, for example, the controller 20 in the substrate processing apparatus 1.

In step S20, the controller 20 analyzes a plurality of recipe models with the GRG under a condition (a predetermined condition) that in-plane uniformity of a wafer after polishing is equal to or smaller than a specified value and combines a part or all of the plurality of recipe models to calculate or obtain a recipe. Note that a combination of a part or all of the plurality of recipe models may be calculated or obtained by machine learning other than the GRG.

In step S30, the controller 20 generates, as a recipe, the combination of the recipe models calculated or obtained by the GRG. The recipe includes the combination of the recipe models and a calculation value of a polishing amount profile obtained by the combination.

In step S40, the controller 20 calculates in-plane uniformity from the polishing amount profile obtained from the recipe calculated or obtained by the GRG and determines whether the in-plane uniformity is within a target range (satisfies the predetermined condition).

When determining in step S40 that the in-plane uniformity is within the target range, the controller 20 adopts the present recipe and ends the recipe generation processing. On the other hand, when determining in step S40 that the in-plane uniformity is not within the target range, the controller 20 advances the processing to step S50.

In step S50, the controller 20 interpolates values of the recipe items to thereby add (interpolate) a recipe model. For example, when there are the number of head revolutions of 11 rpm (the case 01) and the number of head revolutions of 41 rpm (the case 02), the controller 20 interpolates the number of head revolutions of 26 rpm (does not change the other recipe items). When such interpolation is possible (YES in step S60), the controller 20 advances the processing to step S70.

In step S70, the controller 20 determines whether it is necessary to generate a recipe model in a short time. When it is necessary to generate a recipe model in a short time, the controller 20 advances the processing to step S80. On the other hand, when it is unnecessary to generate a recipe model in a short time, the controller 20 advances the processing to step S90.

In step S80, the controller 20 generates, with statistical processing, a recipe model to be added. The controller 20 adds the generated recipe model to the existing recipe models. For example, the controller 20 generates a recipe model in the case of the number of head revolutions of 26 rpm between the case 01 and the case 02. In the statistical processing, for example, as shown in FIG. 9, a polishing amount Y2 at any point in the case of processing for 10 seconds is calculated or obtained by a multiple regression formula of the following Expression 2.

$$Y2 = a1 \cdot x1 + a2 \cdot x2 + a3 \cdot x3 \qquad \text{(Expression 2)}$$

where, x1 represents the number of head revolutions, x2 represents the number of wafer revolutions, and x3 represents a head position.

Note that coefficients a1 to a3 are acquired in advance from a result calculated by a simulation. A polishing amount profile is calculated or obtained using Expression 2.

As statistical processing other than the above, there are 1) neural network/deep learning and 2) a decision tree. A recipe model (a recipe model to be interpolated) may be generated by these methods.

In step S90, the controller 20 generates, with a simulation, a recipe model to be added. The controller 20 adds the generated recipe model to the existing recipe models. For example, the controller 20 generates a recipe model in the case of the number of head revolutions of 26 rpm between the case 01 and the case 02 in the same manner as the simulation in step S10.

When determining in step S60 that the interpolation is not possible (No in step S60), in step S100, the controller 20 determines that a solution of the combination of the recipe models satisfying the predetermined condition is not found and ends the flow of the recipe generation.

After generating the recipe model to be added in step S80 or S90, the controller 20 advances the processing to step S20. The controller 20 analyzes, using a plurality of recipe models to which the recipe model generated in step S80 or S90 is added, the plurality of recipe models with the GRG or the machine learning under the condition (the predetermined condition) that in-plane uniformity is equal to or smaller than the specified value and generates a recipe according to a combination of a part or all of the plurality of recipe models (steps S20 and S30). The controller 20 calculates in-plane uniformity from a polishing amount profile by the generated recipe, and when the in-plane uniformity satisfies the predetermined condition (Yes in step S40), decides the recipe and ends the recipe generation flow. On the other hand, when the in-plane uniformity calculated from the polishing amount profile does not satisfy the predetermined condition (No in S40), the controller 20 repeats the processing in step S50 and subsequent steps explained above.

In the above explanation, the recipe model including the polishing amount profile is created. On the other hand, when a film thickness distribution (a profile) of the wafer before polishing is known, a model for subtracting a polishing amount profile obtained by a simulation from the film thickness distribution is generated. FIG. 10 shows an example in which the film thickness distribution of the wafer before polishing is known as 70 μm, 80 μm, and 60 μm respectively in positions r=0.5 (15 mm), r=1.0 (30 mm), and r=1.5 (45 mm) in the radial direction. At this time, as a result of performing a simulation under conditions (the head position=70 mm, the number of wafer revolutions=105 rpm, the number of head revolutions 11 rpm, and the processing time=10 seconds) of the model case 01 of the recipe, polishing amounts (μm) in radial direction positions r=0.5, 1.0, and 1.5 are respectively 50 μm, 40 μm, and 30 μm. As a result, it is seen that film thicknesses after polishing are respectively 20 μm, 40 μm, and 30 μm in the radial direction positions r=0.5, 1.0, and 1.5. Note that film thickness distributions after the polishing can be calculated or obtained in the same manner in the other model cases other than the case 01. From recipe models including the film thickness distributions obtained in this way, as in the flow shown in FIGS. 7 and 8, with the GRG, a combination of recipe models in which in-plane uniformity is within the target range is calculated or obtained as a recipe. In this case, because the film thickness distribution of the wafer before the polishing is taken into account, it is possible to further improve accuracy of the recipe.

Note that the film thickness distribution of the wafer can be acquired from a film thickness measuring device set in the polishing apparatus, or a test result before conveyance into the polishing apparatus (measurement results of a film thickness in other wafer processing apparatuses such as a plating apparatus or measurement results of a film thickness in other test apparatuses). When the film-thickness measuring section 22 (FIG. 1) is provided in the polishing apparatus 1, the film thickness distribution can be calculated or obtained by the film-thickness measuring device 22A.

(Modification 1)

In the above explanation, the recipe generation in the polishing apparatus 1 for rear surface polishing functioning as the substrate processing apparatus is explained as an example. However, the present invention is also applicable to recipe generation of other substrate processing apparatuses including a CMP apparatus. For example, in the case of a plating apparatus, as recipe items of plating, an anode mask diameter, a regulation plate diameter, current density, and a processing time can be selected. However, a part of the recipe items may be omitted. Recipe items may be added to the recipe items. In the case of a CMP apparatus, as recipe items of polishing, a position of a head, the number of wafer revolutions, the number of head revolutions, a head airbag pressure, a slurry flow rate, a slurry supply position, the number of revolutions of a turn table, the number of revolutions of a polishing unit, a top ring pressing load, a retainer pressing load, and a processing time can be selected. However, a part of the recipe items may be omitted. Recipe items may be added to the recipe items.

(Modification 2)

Figure 11:
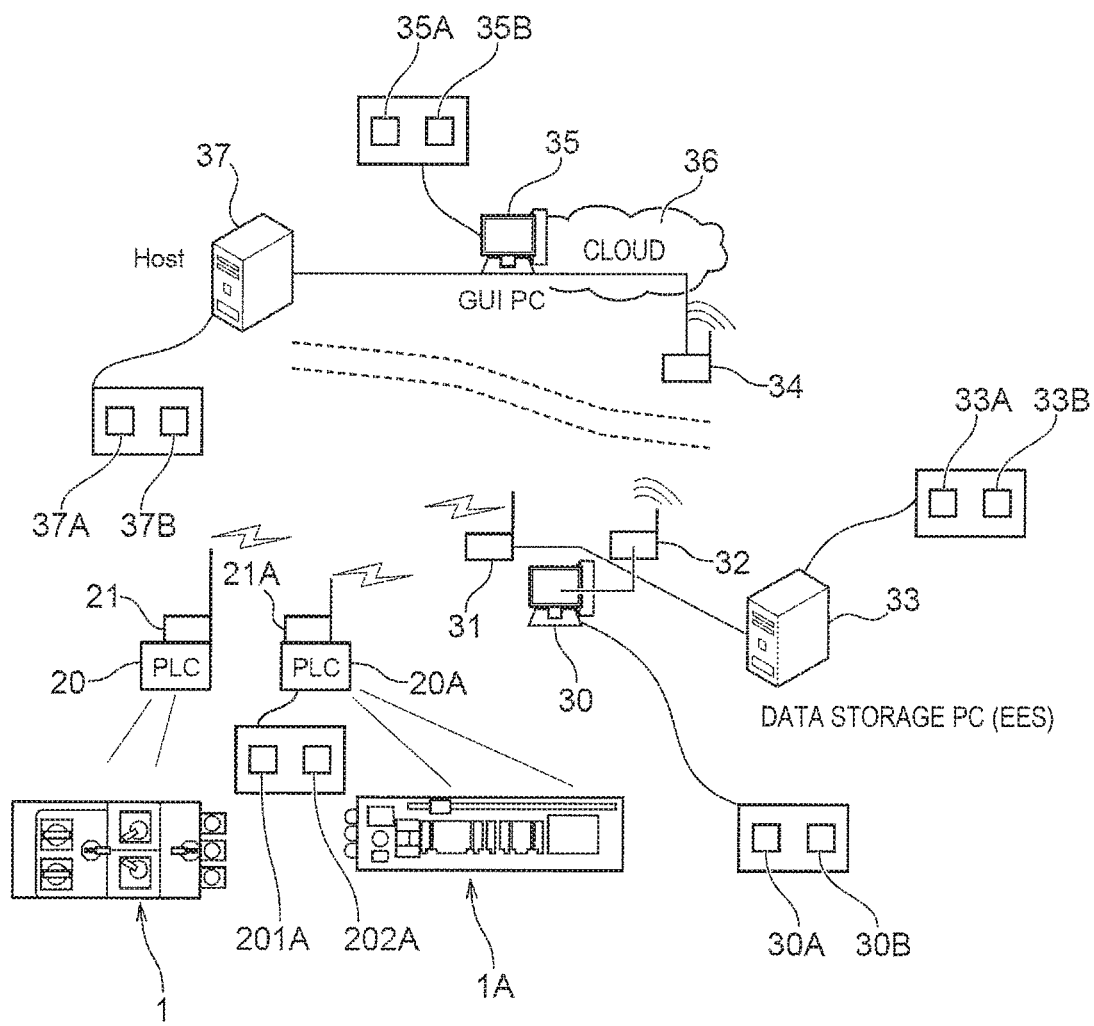
FIG. 11 is an explanatory diagram of recipe generation performed in a remote computer.

FIG. 11 is an explanatory diagram of recipe generation performed in a remote computer. In FIG. 11, an example is shown in which the polishing apparatus 1 and a plating apparatus 1A functioning as substrate processing apparatuses are set in a semiconductor manufacturing factory. A computer (PC) 30 configured to be communicable with the polishing apparatus 1 and the plating apparatus 1A by wire or radio is set. The PC 30 is connected to a data storage PC 33, which stores various processing data of the substrate processing apparatuses, by wire or radio. In this embodiment, the controller 20 of the polishing apparatus 1 includes a communication device 21 capable of performing wireless communication. A controller 20A of the plating apparatus 1A includes a communication device 21A capable of performing wireless communication. The PC 30 includes a communication device 31 capable of wirelessly communicating with the communication devices 21 and 21A and a communication device 32 capable of communicating with a communication device 34 connected to a cloud 36. Note that the communication device 31 and the communication device 32 may be shared by the same communication device. The communication device 34 connected to the cloud 36 is present outside the semiconductor manufacturing factory, for example, in a remote place. The cloud 36 is connected to a host computer 37 via a PC 35. The host computer 37 is a computer having a higher arithmetic processing ability than a computer in the semiconductor manufacturing factory and is, for example, a server or a supercomputer having a large calculation ability.

The controller 20A includes a memory 202A having stored therein various setting data and various computer programs and a CPU 201A that executes the computer programs stored in the memory 202A. Similarly, the PC 30, the data storage PC 33, the PC 35, and the host computer 37 include memories 30B, 33B, 35B, and 37B having stored therein various setting data and various computer programs and CPUs 30A, 33A, 35A, and 37A that execute the computer programs stored in the memories 30B, 33B, 35B, and 37B.

In such a configuration, for example, when recipe models of the substrate processing apparatuses 1 and 1A are generated, it is possible to perform, with the host computer 37, a simulation calculation having a large processing load. The substrate processing apparatuses 1 and 1A transmit data including recipe items to the host computer 37 via the PC 30 and the cloud 36. The host computer 37 can perform a simulation on the basis of the recipe items, calculate a polishing amount profile, and return data of a calculation result of recipe models (e.g., the cases 01 to 05 shown in FIG. 5) to the substrate processing apparatuses 1 and 1A via the cloud 36 and the PC 30. In such a configuration, the host computer having a high calculation ability can perform a calculation with a large processing load. Therefore, a load of processing on the substrate processing apparatus side can be reduced. A calculation time can be reduced. Note that, in addition to (or instead of) the generation of the recipe model, the host computer 37 may perform processing for combining a part or all of a plurality of recipe models to generate a recipe (e.g., an analysis by the GRG or the machine learning) and the substrate processing apparatuses 1 and 1A may perform comparison of an analysis result and real data.

(Modification 3)

After recipe generation, a processing result by the substrate processing apparatus may be always monitored. The recipe may be updated at any time. For example, a film thickness distribution of the wafer after the processing by the substrate processing apparatus is actually measured by the film-thickness measuring device. When in-plane uniformity calculated from the film thickness distribution is outside a target range and/or when the in-plane uniformity tends to deviate from the target range, update of the recipe can be automatically performed. The update of the recipe can be performed by at least one kind of processing among interpolation of a recipe model, deletion of a recipe model, and new addition of a recipe model.

Instead of or in addition to the monitoring of the film thickness distribution of the wafer after the processing, a particle amount on the wafer after the processing may be always monitored. In this case, a particle counter is provided on the inside or the outside of the substrate processing apparatus. The particle amount on the wafer after the processing is measured by the particle counter. When a measurement value of the particle amount is outside the target range and/or when the particle amount tends to deviate from the target range, the update of the recipe can be automatically performed.

At least the following technical ideas can be grasped from the above embodiments.

[1] According to a first form, there is provided a substrate processing apparatus for processing a substrate, the substrate processing apparatus including: a setting device or circuit that sets a plurality of recipe items including operation conditions of the substrate processing apparatus; and a recipe generating device or circuit that acquires a plurality of recipe models obtained by changing values of the plurality of recipe items and experimenting or simulating a processing result of the substrate and analyzes the plurality of recipe models to generate a recipe, the recipe generating device combining a part or all of the plurality of recipe models to generate the recipe such that a calculation value of a processing result of the substrate by the recipe satisfies a predetermined condition.

According to the first form, it is possible to combine a part or all of the plurality of recipe models and automatically generate a recipe such that a substrate processing result satisfies the predetermined condition. Consequently, it is possible to automatically perform complicated processing for combining a part or all of the plurality of recipe models. It is possible to generate a highly accurate recipe.

[2] According to a second form, the substrate processing apparatus according to the first form further includes a model generating device or circuit that generates the plurality of recipe models with a simulation or an experiment.

According to the second form, it is possible to automatically generate the plurality of recipe models.

[3] According to a third form, in the substrate processing apparatus according to the first or second form, the recipe generating device generates the recipe using a plurality of recipe models and, when a processing result by the recipe does not satisfy the predetermined condition, adds at least one recipe model, and combines a part or all of the plurality of recipe models after the addition to generate a new recipe.

According to the third form, when a processing result satisfying the predetermined condition is not obtained by an analysis based on a recipe model prepared in the beginning, a recipe model is added and the recipe models are analyzed again. Therefore, possibility of generation of a recipe satisfying the predetermined condition increases.

[4] According to a fourth form, in the substrate processing apparatus according to the third form, the recipe generating device adds at least one recipe model corresponding to a value between a value of at least one recipe item of one recipe model and a value of the at least one recipe item of another recipe model.

According to the fourth form, because already set values of recipe items are interpolated, it is easy to calculate or obtain a recipe model to be added.

[5] According to a fifth form, in the substrate processing apparatus according to the third form, the recipe generating device generates, with a simulation, the at least one recipe model to be added.

According to the fifth form, it is possible to generate an accurate recipe model with the simulation.

[6] According to a sixth form, in the substrate processing apparatus according to the third form, the recipe generating device generates, with a statistical method, the at least one recipe model to be added.

According to the sixth form, it is possible to generate the recipe model with the statistical method in a shorter time.

[7] According to a seventh form, in the substrate processing apparatus according to any one of the first to sixth forms, the recipe generating device analyzes the plurality of recipe models with a generalized reduced gradient method (GRG). Note that the plurality of recipe models may be analyzed by an analysis by machine learning other than the GRG.

According to the seventh form, it is possible to automatically generate the recipe using available software of the GRG without generating a dedicated analysis program.

[8] According to an eighth form, in the substrate processing apparatus according to any one of the first to seventh forms, the recipe generating device always monitors an actual processing result of the substrate by the substrate processing apparatus and updates the recipe when the processing result does not satisfy the predetermined condition.

According to the eighth form, the processing result of the substrate by the substrate processing apparatus is always monitored to update the recipe. Therefore, it is possible to always maintain the recipe in a satisfactory state. It is possible to maintain the substrate processing result in a satisfactory state.

[9] According to a ninth form, in the substrate processing apparatus according to the first form, the substrate processing apparatus is connected to an external computer via a communication line and acquires the plurality of recipe models generated in the computer.

According to the ninth form, it is possible to reduce a processing load in the substrate processing apparatus by generating the recipe models in the external computer. If an external computer having a high processing ability is used, it is possible to reduce a time period required for the recipe model generation. Note that, in addition to (or instead of) the generation of the recipe models, processing for analyzing the plurality of recipe models (e.g., an analysis by the GRG or the machine learning) may be performed in the external computer and comparison of an analysis result and actual data may be performed in the substrate processing apparatus.

[10] According to a tenth form, in the substrate processing apparatus according to any one of the first to ninth forms, the predetermined condition is that in-plane uniformity of the substrate to be processed by the recipe is within a predetermined range.

According to the tenth form, it is possible to generate the recipe such that the in-plane uniformity within the desired range is obtained.

[11] According to an eleventh form, in the substrate processing apparatus according to the eighth form, the recipe generating device always monitors a particle amount on the substrate and updates the recipe when the particle amount does not satisfy a predetermined condition.

According to the eleventh form, the particle amount on the substrate is always monitored to update the recipe. Therefore, it is possible to always maintain the recipe in a satisfactory state.

[12] According to a twelfth form, in the substrate processing apparatus according to any one of the first to eleventh forms, the substrate processing apparatus is a polishing apparatus including a polishing head, the plurality of recipe items include a number of revolutions of the polishing head, a number of revolutions of the substrate, a position of the polishing head, and a processing time, and the processing result is a polishing amount profile or a film thickness distribution of the substrate after the processing.

According to the twelfth form, it is possible to generate the recipe such that a desired processing result is obtained in a rear surface polishing apparatus that polishes the entire rear surface of the substrate.

[13] According to a thirteenth form, in the substrate processing apparatus according to the twelfth form, the plurality of recipe models are generated by changing a combination of values of the recipe items other than the processing time.

According to the thirteenth form, with the processing time set to a fixed unit time, the values of the other recipe items are changed to generate the plurality of recipe models. Therefore, it is possible to efficiently generate the recipe models. For example, by selecting one or a plurality of the same recipe models according to necessity, it is possible to substantially adopt recipe models having different processing times.

[14] According to fourteenth form, there is provided a method for processing a substrate, including the steps of: holding the substrate; and processing the held substrate, wherein the processing of the substrate is performed by setting in advance a plurality of recipe items including operation conditions of a substrate processing apparatus, acquiring a plurality of recipe models obtained by changing values of the plurality of recipe items and experimenting or simulating a processing result of the substrate, analyzing the plurality of recipe models which are acquired to combine a part or all of the plurality of recipe models to generate a recipe such that a calculation value of a processing result of the substrate satisfies a predetermined condition, and processing the substrate by the generated recipe.

According to fourteenth form, it is possible to combine a part or all of the plurality of recipe models and automatically generate a recipe such that a substrate processing result satisfies the predetermined condition. Consequently, it is possible to automatically perform complicated processing for combining a part or all of the plurality of recipe models. It is possible to generate a highly accurate recipe.

[15] According to fifteenth form, with the method of fourteenth form, the recipe is generated using a plurality of recipe models and, when a calculation value of a processing result of the substrate by the recipe does not satisfy the predetermined condition, at least one recipe model is added, and a part or all of the plurality of recipe models are combined after the addition to generate a new recipe.

According to fifteenth form, similar functions and effects to the third form will be obtained.

[16] According to sixteenth form with the method of fifteenth form, the at least one recipe model to be added are generated with a statistical method.

According to sixteenth form, similar functions and effects to the sixth form will be obtained.

[17] According to seventeenth form, with the method of any one of fourteenth to sixteenth forms, the plurality of recipe models are analyzed with a generalized reduced gradient method (GRG).

According to seventeenth form, similar functions and effects to the seventh form will be obtained.

[18] According to eighteenth form, with the method of any one of fourteenth to seventeenth forms, the steps includes always monitoring an actual processing result of the substrate by the substrate processing apparatus and updates the recipe when the processing result does not satisfy the predetermined condition.

According to eighteenth form, similar functions and effects to the eighth form will be obtained.

[19] According to fourteenth form, the substrate processing apparatus is connected to an external computer via a communication line, the external computer generates the plurality of recipe models and the substrate processing apparatus acquires the plurality of recipe models from the external computer via the communication line.

According to nineteenth form, similar functions and effects to the ninth form will be obtained.

[20] According to a twentieth form, there is provided a storage medium having stored therein a computer program for causing a computer to execute: setting a plurality of recipe items including operation conditions of a substrate processing apparatus; acquiring a plurality of recipe models calculated or obtained by changing values of the plurality of recipe items and experimenting or simulating a processing result of the substrate; and analyzing the plurality of recipe models to generate a recipe by combining a part or all of the plurality of recipe models to generate the recipe such that a calculation value of a processing result of the substrate by the recipe satisfies a predetermined condition. The storage medium includes, for example, a non-transitory computer readable storage medium.

The embodiment of the present invention is explained above with reference to the several examples. However, the embodiment of the present invention is to facilitate understanding of the present invention and is not to limit the present invention. The present invention can be changed and improved without departing from the spirit of the present invention. It goes without saying that equivalents of the present invention are included in the present invention. In a range in which at least a part of the problems described can be solved or a range in which at least a part of the effects described can be achieved, the constituent elements described in the claims and the specification can be optionally combined or omitted.

The present application claims priority to Japanese Patent Application No. 2017-099141 filed on May 18, 2017. The entire disclosure of Japanese Patent Application No. 2017-099141 filed on May 18, 2017 including specification, claims, drawings and summary is incorporated herein by reference in its entirety.

The entire disclosures of Japanese Patent Laid-Open No. 2010-260140 (PTL 1), Japanese Patent Laid-Open No. 2014-150178 (PTL 2), and Japanese Patent Laid-Open No. 2015-211133 (PTL 3), including specification, claims, drawings and summary are incorporated herein by reference in their entirety.

REFERENCE SIGNS LIST 1 polishing apparatus
1A plating apparatus
2 load port
3 conveyance robot
4 wafer station
5 conveyance robot
6 polishing unit
7 polishing head
8 centering loader
9 polishing unit
10 polishing head
11 arm
12 wafer station
13 swing transporter
14 reversing machine
15 linear transporter
16, 17, 18 cleaning unit
19 drying unit
20, 20A controller
201, 201A CPU
202, 202A memory
21, 21A communication device
22 film-thickness measuring unit
22A film-thickness measuring device
30 PC
30A, 33A, 35A, 37A CPU
30B, 33B, 35B, 37B memory
31 communication device
32 communication device
33 data storage PC
34 communication device
35 PC
36 cloud

What is claimed is:

1. A substrate processing apparatus for processing a substrate, the substrate processing apparatus comprising:
a controller configured to set a plurality of recipe items comprising operation conditions of the substrate processing apparatus,
the controller being further configured to acquire a plurality of recipe models obtained by changing values of the plurality of recipe items and experimenting or simulating a processing result of the substrate, each recipe model configured to correspond to one of a plurality of steps included in a recipe, each recipe model including the plurality of recipe items and the processing result by the values of the plurality of recipe items in the recipe model,
the controller being further configured to analyze the plurality of recipe models to generate the recipe and calculate a value of a processing result of the substrate by the recipe, the controller configured to select an order and a combination of a part or all of the plurality of recipe models to generate the recipe such that a calculation value of the processing result of the substrate by the recipe satisfies a predetermined condition, wherein the controller is configured to generate the recipe by analyzing the plurality of recipe models and, when the calculation value of the processing result of the substrate by the recipe does not satisfy the predetermined condition, to add at least one recipe model generated with a simulation or a statistical method without experiment, and to select an order and a combination of a part or all of the plurality of recipe models after the addition to generate a new recipe; and
the controller being further configured to process the substrate based on the generated new recipe that satisfies the predetermined condition,
wherein the controller is configured to generate the at least one recipe model to be added, by determining a set of the plurality of the recipe items which includes a determined value between a value of at least one recipe item of one recipe model and a value of the at least one recipe item of another recipe model, and obtaining the processing result under the condition of the set of the plurality of recipe items with the simulation or the statistical method.

2. The substrate processing apparatus according to claim 1, wherein the controller analyzes the plurality of recipe models with a generalized reduced gradient method (GRG).

3. The substrate processing apparatus according to claim 1, wherein the controller always monitors an actual processing result of the substrate by the substrate processing apparatus and updates the recipe when the processing result does not satisfy the predetermined condition.

4. The substrate processing apparatus according to claim 3, wherein the controller always monitors a particle amount on the substrate and updates the recipe when the particle amount does not satisfy a predetermined condition.

5. The substrate processing apparatus according to claim 1, wherein the substrate processing apparatus is connected to an external computer via a communication line and acquires the plurality of recipe models generated in the computer.

6. The substrate processing apparatus according to claim 1, wherein the predetermined condition is that in-plane uniformity of the substrate to be processed by the recipe is within a predetermined range.

7. The substrate processing apparatus according to claim 1, wherein the
substrate processing apparatus is a polishing apparatus including a polishing head, the
plurality of recipe items include a number of revolutions of the polishing head, a number of revolutions of the substrate, a position of the polishing head, and a processing time, and
the processing result is a polishing amount profile or a film thickness distribution of the substrate after the processing.

8. The substrate processing apparatus according to claim 7, wherein the plurality of recipe models are generated by changing a combination of values of the recipe items other than the processing time.

9. A method for processing a substrate, said method comprising:
holding the substrate; and
processing the held substrate, wherein
the processing of the substrate is performed by
(a) setting in advance a plurality of recipe items including operation conditions of a substrate processing apparatus,
(b) acquiring a plurality of recipe models obtained by changing values of the plurality of recipe items and experimenting or simulating a processing result of the substrate, each recipe model configured to correspond to one of a plurality of steps included in a recipe, each recipe model including the plurality of recipe items and the processing result by the values of the plurality of recipe items in the recipe model, (c) analyzing the plurality of recipe models to generate the recipe and calculating a value of a processing result of the substrate by the recipe, and selecting an order and a combination of a part or all of the plurality of recipe models to generate the recipe such that the calculation value of the processing result of the substrate satisfies a predetermined condition,
- wherein generating the recipe includes generating the recipe by analyzing the plurality of recipe models and, when the calculation value of a processing result of the substrate by the recipe does not satisfy the predetermined condition, adding at least one recipe model generated with a simulation or a statistical method without experiment, and selecting an order and a combination of a part or all of the plurality of recipe models after the addition to generate a new recipe, and
- (d) processing the substrate by the generated new recipe that satisfies the predetermined condition,
- wherein the at least one recipe model to be added is generated, by determining a set of the plurality of the recipe items which includes a determined value between a value of at least one recipe item of one recipe model and a value of the at least one recipe item of another recipe model, and obtaining the processing result under the condition of the set of the plurality of recipe items with the simulation or the statistical method.

10. The method according to claim 9, wherein the plurality of recipe models are analyzed with a generalized reduced gradient method (GRG).

11. The method according to claim 9, including always monitoring an actual processing result of the substrate by the substrate processing apparatus and updates the recipe when the processing result does not satisfy the predetermined condition.

12. The method according to claim 9, wherein the substrate processing apparatus is connected to an external computer via a communication line, the external computer generating the plurality of recipe models and the substrate processing apparatus acquiring the plurality of recipe models from the external computer via the communication line.

13. A non-transitory computer readable storage medium having stored therein a computer program for causing a computer to execute:
- (a) setting a plurality of recipe items including operation conditions of a substrate processing apparatus;
- (b) acquiring a plurality of recipe models obtained by changing values of the plurality of recipe items and experimenting or simulating a processing result of the substrate, each recipe model configured to correspond to one of a plurality of steps included in a recipe, each recipe model including the plurality of recipe items and the processing result by the values of the plurality of recipe items in the recipe model; and
- (c) analyzing the plurality of recipe models to generate the recipe and calculating a value of a processing result of the substrate by the recipe, and selecting an order and a combination of a part or all of the plurality of recipe models to generate the recipe such that the calculation value of the processing result of the substrate by the recipe satisfies a predetermined condition, wherein generating the recipe includes generating the recipe by analyzing the plurality of recipe models and, when the calculation value of a processing result of the substrate by the recipe does not satisfy the predetermined condition, adding at least one recipe model generated with a simulation or a statistical method without experiment, and selecting an order and a combination of a part or all of the plurality of recipe models after the addition to generate a new recipe; and
- (d) causing the substrate processing apparatus to process the substrate based on the generated new recipe that satisfies the predetermined condition,
- wherein the program generates the at least one recipe model to be added, by determining a set of the plurality of the recipe items which includes a determined value between a value of at least one recipe item of one recipe model and a value of the at least one recipe item of another recipe model, and obtaining the processing result under the condition of the set of the plurality of recipe items with the simulation or the statistical method.

* * * * *